UNITED STATES PATENT OFFICE

3,505,354
2-METHYL-3-p-HALOBENZOYLINDOLE-N-ALIPHATIC ACIDS

Karl J. Doebel and Jan W. F. Wasley, Ossining, N.Y., assignors to Geigy Chemical Corporation, Ardsley, N.Y., a corporation of New York
No Drawing. Filed May 18, 1967, Ser. No. 639,262
Int. Cl. C07d 27/56
U.S. Cl. 260—326.13                    5 Claims

ABSTRACT OF THE DISCLOSURE

The compounds are of the class of indole derivatives substituted in the 1-position by a fatty acid and in the 3-position by a halogeno(chloro)benzoyl group which are useful antiinflammatory agents. An illustrative embodiment is 5-methoxy-2-methyl-3-p-chlorobenzoylindole-N-α-methyl propionic acid.

BACKGROUND OF THE INVENTION

Field of the invention

The present invention relates to compounds which may be characterized by the following formula

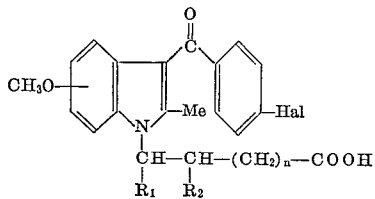

wherein $R_1$ and $R_2$ each independently are hydrogen or lower alkyl, preferably methyl and ethyl;
$n$ is an integer of from 0 to 2;
Me is methyl, and Hal is halogen, preferably chlorine, and wherein the methoxy group may be fixed in the 4, 5, 6 or 7-position but is preferably fixed in the 5- or 6-position.

Furthermore, the present invention relates to novel methods and compositions containing a compound of the above-mentioned formula for producing an antiinflammatory effect in warm-blooded animals. More particularly, the method of producing an antiinflammatory effect in warm-blooded animals is concerned with administering a compound as defined in the above formula in therapeutic doses.

Description of prior art

Indomethacin, i.e., 1-p-chlorobenzoyl-2-methyl-5-methoxy-3-indolyl acetic acid has been described as an antiinflammatory agent in U.S. Patent 3,161,654 to T. Y. Shen. Furthermore, 5-methoxy - 2 - methyl-3-p-chlorobenzoylindole-N-acetic acid which is the "reversed indomethacin" has been tested by L. H. Sarett and T. Y. Shen (International Symposium about inflammation, Freiburg, Germany, May 4 to 6, 1966.), for antiinflammatory activity. The test results showed that the "reversed indomethacin" had only slight traces of antiinflammatory activity. In contrast thereto, the instantly claimed compounds produce good antiinflammatory effects.

SUMMARY OF THE INVENTION

The present invention relates to new substituted indole derivatives which are useful antiinflammatory agents.

DETAILED DESCRIPTION OF THE INVENTION

The advantages of the present invention are attained by providing new compounds exhibiting pharmacologically valuable properties in warm-blooded animals, particularly mammals having a favorable therapeutic ratio. The new compounds correspond to the general formula

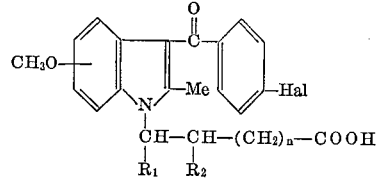

wherein $R_1$ and $R_2$ each independently are hydrogen or lower alkyl, preferably methyl and ethyl;
$n$ is an integer of from 0 to 2;
Me is methyl; and
Hal is halogen, preferably chlorine, and wherein the methoxy group is preferably fixed in the 5- or 6-position.

By the term "lower alkyl" is intended a group comprising a straight hydrocarbon chain containing of from one to about four carbon atoms. Preferred lower alkyl groups are methyl and ethyl.

The compounds of the instant invention can be obtained by simple processes. For instance, the substituted indole derivatives are prepared by condensing p-chlorobenzonitrile with a 4, 5, 6 or 7-methoxy-2-methylindole, alkylating the obtained imine with appropriately substituted acrylates in the presence of a suitable base such as anhydrous potassium carbonate in acetone or sodium alkoxide in a corresponding alcohol and hydrolyzing the intermediate esters in alkaline solution; thus yielding the desired substituted indole derivative. The starting materials are commercially available.

The compound can also be prepared by alkylation of p-chlorophenyl(methoxy-2'-methyl)indolyl ketone, which is obtained, for instance, as a by-product in the above-described process.

According to this invention, the compounds of the above-mentioned formula are administered to warm-blooded animals for the purpose of treating various inflammatory conditions. Illustrative inflammatory conditions alleviated through practice of the instant invention include particularly rheumatoid arthritis and osteoarthritis, but also lesions, brachial neuritis, superficial thrombophlebitis, fibrositis, low back strain, tendosynovitis, muscular rheumatism, sacroiliac strain, cervical spondylosis, tennis elbow, dysmenorrhea, and the like.

While the compounds of the above-indicated formula may be administered via any of the usual routes, e.g., the oral, parenteral, topical, rectal routes or the like; the preferred one being the oral route.

For such administration, the use of a pharmaceutical carrier in the formulation of a pharmaceutical composition is highly desirable. Such compositions then comprise a pharmaceutically acceptable carrier and a compound of the above-indicated formula which are administered according to the method described above in dosage unit forms acceptable for internal administration.

Such suitable compositions include, without limitations, tablets, capsules, powders, solutions, suspensions, sustained release formulations and the like.

By the administration of these compounds in dosages of up to 300 mg./kg. of body weight per day, preferably from about 100 mg./kg. to about 300 mg./kg., anti-inflammatory effects are observed as the following test illustratively shows:

Guinea pigs are fasted overnight after having been denuded over the back area. The test compound is administered orally—half of the total dose is given one hour before ultra violet irradiation and the other half is given immediately after U.V. exposure.

Erythema is produced by 60 second exposure to ultra violet rays emitted by a Hanovia Analytical Model Quartz Lamp with a 500 watt high pressure mercury burner. Erythema is localized to 3–7 mm. areas; evaluation of results takes place 2 hours and 24 hours after ultra violet exposure.

Administration of 100 mg./kg. of 5-methoxy-2-methyl-3-p-chlorobenzoylindole-N-α-methyl propionic acid resulted in 44% protection in comparison with the control animals.

To produce dosage units for peroral application, the compositions of this invention may be combined, e.g., with solid pharmaceutically acceptable pulverulent carriers such as latose, saccharose, sorbitol, mannitol; starches such as potato starch, corn starch or amylopectin, also laminaria powder or citrus pulp powder, cellulose derivatives or gelatin, also lubricants such as magnesium or calcium stearate or polyethylene glycols (carbowaxes) of suitable molecular weights may be added, to form tablets or press coated tablets. The latter are coated for example, with concentrated sugar solutions which can contain, e.g., gum arabic, talcum and/or titanium dioxide, or they are coated with a lacquer dissolved in easily volatile organic solvents or a mixture of organic solvents. Dyestuffs can be added to these coatings, for example, to distinguish between different contents of active substance.

Hard gelatin capsules contain, for example, granulates of the instant composition with solid pulverulent carriers such as, e.g., lactose, saccharose, sorbitol, mannitol and further starches such as potato starch, corn starch or amylopectin, cellulose derivatives or gelatin, as well as magnesium stearate or stearic acid.

Suppositories containing a compound of the present invention are readily obtained by techniques well known to those skilled in the art of compounding dosage forms. A compound of the present invention is dispersed in a carrier such as cocoa butter and the suppositories are formed in the usual way.

The following examples are given by way of illustrating the process for the preparation of the compounds and the compositions without limiting the scope thereof in any way. The temperatures are given in degrees centigrade.

PREPARATION OF THE SUBSTITUTED INDOLE DERIVATIVES

Example 1.—5-methoxy-2-methyl-3-p-chloro-benzoylindole-N-propionic acid 5-methoxy-2-methyl indole (5.3 g.) was dissolved in dry ether (100 ml.) and p-chlorobenzonitrile (14 g.) added. Dry hydrogen chloride was bubbled through the reaction for 8 hours. At first the reaction mixture became cloudy and a yellow solid separated out, which, after a further 2 hours redissolved. After 5 hours a solid again began to separate out. The reaction mixture was tightly stoppered and stored in a refrigerator overnight. The ether was then decanted, fresh ether added and the reaction stirred for 1 hour. The imine hydrochloride was then removed by filtration and dried in vacuo. It was then dissolved in hot aqueous ethanol and basified with 10% ammonium hydroxide. The product crystallized from aqueous ethanol as colorless needles, M.P. 190–192° (4.2 g., 43%), identified as 5-methoxy-2-methyl-3-p-chloro-benziminoindole.

Analysis.—Calc'd for $C_{17}H_{16}N_2OCl$ (percent): C, 68.20; H, 5.38; N, 9.35; Cl, 11.84. Found (percent): C, 68.15; H, 5.33; N, 9.37; Cl, 11.72.

5-methoxy - 2 - methyl-3-p-chlorobenziminoindole (5.0 g.:0.017 mole), methyl acrylate (1.7 g.:0.017 mole), acetone (150 ml.), and anhydrous potassium carbonate (1.0 g.) were combined and heated under reflux for 72 hours. On cooling, the solid was removed by filtration and washed well with acetone (100 ml.). The combined filtrates were then evaporated to dryness under reduced pressure, leaving a brown oily residue, which was heated under reflux with 3 N sodium hydroxide (50 ml.) until a homogeneous solution was obtained (circa 2 hrs.). On cooling, a white precipitate formed (Na salt), which was removed by filtration, dissolved in hot water (750 ml.) and acidified (pH 2) with 10% $H_2SO_4$. The product was collected, dried in vacuo and crystallized from ethanol as colorless needles, (3.6 g.:58%) M.P. 183–4°.

Analysis.—Calc'd for $C_{20}H_{18}ClNO_4$ (percent): C, 64.61; H, 4.88; N, 3.77; Cl, 9.55. Found (percent): C, 64.90; H, 4.91; N, 3.66; Cl, 9.55.

If 5 - methoxy-2-methyl-3-p-chlorobenziminoindole is replaced by 6 - methoxy-2-methyl-3-p-chlorobenzimino-indole, 6-methoxy - 2 - methyl-3-p-chlorobenzoylindole-N-propionic acid is obtained when working according to Example 1.

In analogy to the above-described procedure, 5-methoxy-2-methyl-3-p-chlorobenzoylindole - N - butyric acid and 5-methoxy - 2 - methyl-3-p-chlorobenzoylindole-N-valeric acid can be prepared by substituting methyl acrylate by appropriately substituted alkyl alkylene carboxylates.

Example 2.—5-methoxy-2-methyl-3-p-chlorobenzoyl-indole-N-α-methyl-propionic acid 5-methoxy-2-methyl-3-p-chlorobenziminoindole (5.0 g.) (prepared as described above), methyl methacrylate (10.0 g.), anhydrous potassium carbonate (16.0 g.) and acetone (150 ml.) were combined and heated under reflux for 72 hours. After cooling, the solid was filtered off and washed well with acetone (100 ml.). The filtrate was evaporated to dryness under reduced pressure and the brown solid residue refluxed for two hours with 3 N sodium hydroxide (100 ml.). The reaction was cooled and the white precipitate separated by filtration. This precipitate was then suspended in boiling water (1 liter). The sodium salt of the desired product dissolved, allowing the 5-methoxy-2-methyl-3-p-chlorobenzoylindole (4.0 g., M.P. 182–4°) to be separated by filtration. The filtration was acidified with 10% $H_2SO_4$, the product collected, and recrystallized from ethanol as very pale yellow needles (400 mg.:6.2%, M.P. 178–9°).

Analysis.—Calc'd for $C_{21}H_{20}ClNO_4$ (percent): C, 65.38; H, 5.27; N, 3.63; Cl, 9.20. Found (percent): C, 65.28; H, 5.27; N, 3.67; Cl, 9.41.

If 5-methoxy-2-methyl-3-p-chlorobenziminoindole is replaced by 6-methoxy-2-methyl-3-p-chlorobenziminoindole, 6-methoxy-2-methyl-3-p - chlorobenzoylindole-N-α-methyl propionic acid is obtained when working according to Example 2.

5-methoxy-2-methyl - 3 - p - chlorobenzoylindole-N-α-ethyl propionic acid is obtained by replacing methyl-methacrylate by methyl-α-ethylacrylate when working according to Example 2.

PREPARATION OF COMPOSITIONS

Example 3.—Capsule

| Ingredient: | Quantity, mg. |
|---|---|
| 5 - methoxy-2-methyl-3-p - chlorobenzoylindole-N-propionic acid | 300 |
| Corn starch, U.S.P. | 200 |

The ingredients are mixed and introduced into a two-piece hard gelatin No. 1 capsule.

Example 4.—Tablet

| Ingredient: | Quantity, mg. |
|---|---|
| 5-methoxy - 2 - methyl-3-p-chlorobenzoylindole-N-α-methyl propionic acid | 300 |
| Corn starch, U.S.P. | 150 |
| Lactose, U.S.P. | 180 |
| Carb-O-Sil M–5 | 4 |
| Gelatin, U.S.P. | 5 |
| Magnesium stearate, U.S.P. | 1 |

The above ingredients, after being thoroughly mixed, are pressed into single scored tablets.

Any changes in conditions to those skilled in the art are considered within the scope of this invention.

What is claimed is:
1. A compound of the formula

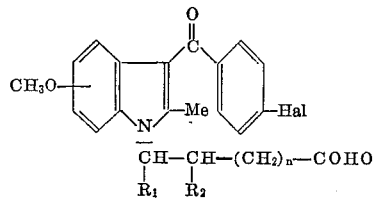

wherein
$R_1$ and $R_2$ each independently are hydrogen, or lower alkyl;
$n$ is an integer of from 0 to 2; and
Me is methyl, and
Hal is halogen.

2. A compound as defined in claim 1 wherein $R_1$ and $R_2$ are hydrogen or lower alkyl, $n$ is an integer of from 0 to 2, Me is methyl, Hal is chlorine and wherein the methoxy group is fixed in 5-position.

3. A compound as defined in claim 1 wherein $R_1$ and $R_2$ are hydrogen or lower alkyl, $n$ is an integer of from 0 to 2, Me is methyl, Hal is chlorine and wherein the methoxy group is fixed in 6-position.

4. A compound as defined in claim 1 wherein $R_1$ is hydrogen, $R_2$ is methyl, $n$ is 0, Me is methyl, Hal is chlorine, and the methoxy group is in 5-position.

5. A compound as defined in claim 1 wherein $R_1$ and $R_2$ are hydrogen, $n$ is 0, Me is methyl, Hal is chlorine, and the methoxy group is in 5-position.

References Cited

UNITED STATES PATENTS 3,322,787  5/1967  Sletzinger et al. ____ 260—326.14

OTHER REFERENCES

Sarett et al., Die Entzundung (Internationales Symposium), May 4–6, 1966, Frieburg, Germany, pp. 291–293.

Abstract of French Patent (B.S.M.), No. 2079M, 1966.

ALEX MAZEL, Primary Examiner

J. A. NARCAVAGE, Assistant Examiner

U.S. Cl. X.R.

260—326.16; 424—274